UNITED STATES PATENT OFFICE.

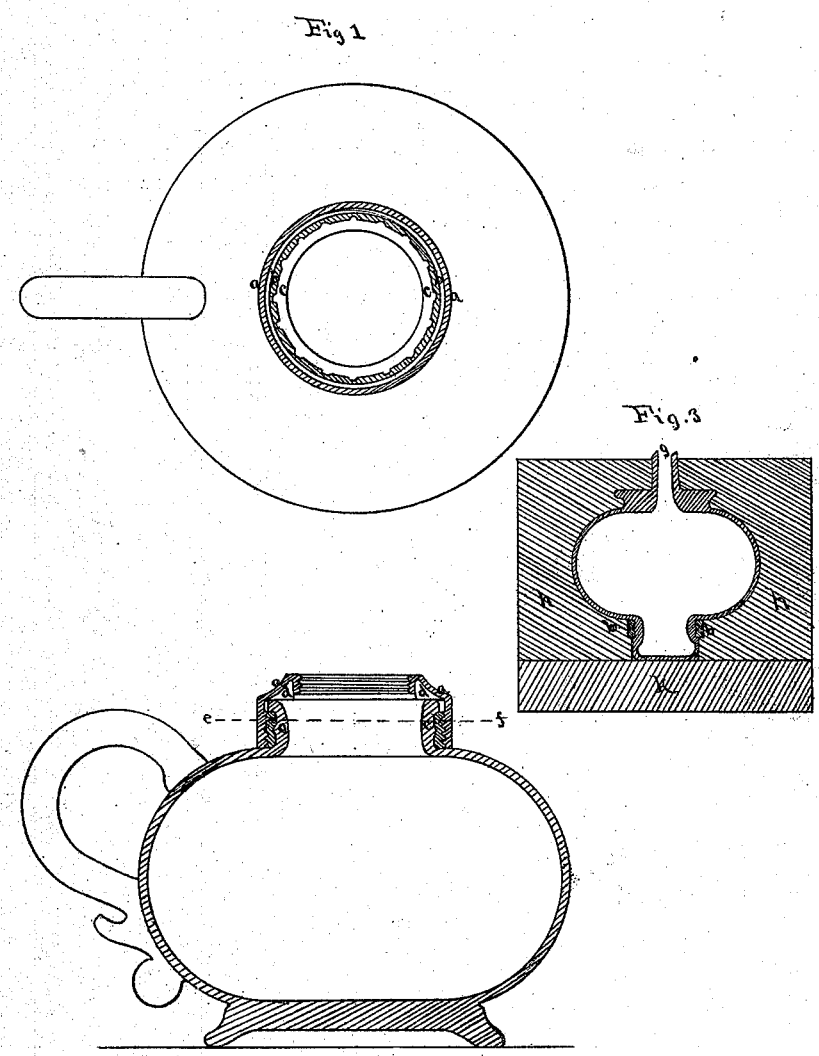

JONATHAN J. HOYT, OF CHELMSFORD, AND JOHN E. CRANE, OF LOWELL, ASSIGNORS TO SAID JONATHAN J. HOYT AND THE LOWELL OIL CUP COMPANY, OF LOWELL, MASSACHUSETTS.

IMPROVEMENT IN CONSTRUCTION OF LAMPS.

Specification forming part of Letters Patent No. 112,598, dated March 14, 1871.

*To all whom it may concern:*

Be it known that we, JONATHAN J. HOYT, of Chelmsford, and JOHN E. CRANE, of Lowell, both in the county of Middlesex and State of Massachusetts, have invented certain new and useful Improvements in Lamps, of which the following is a full, clear, and exact description, reference being had to the accompanying drawing, making part of this specification.

This invention relates to an improvement in lamps, whereby the metal top is easily and conveniently applied without the aid of plaster or other common holding substance, and whereby said top is rendered removable and changeable to another lamp without injury to the lamp or removable top, the new means employed being a metal screw-furnished ring, applied to the neck of the lamp by blowing the glass within the ring, the glass protruding above or beyond the ring to form a packing-joint between it and the metal top, or by a compressible washer between the two parts last named.

In the drawing we have shown three sectional elevations, that shown in Figure 1 being on the line *e f* of Fig. 2.

The latter figure represents a central vertical section of a common hand-lamp with the ring and top applied according to our improvement.

Fig. 3 represents a section of a mold with the lamp blown within it, and the neck of the lamp blown within the ring.

After a lamp has been thus blown in the mold and removed therefrom, the blow-hole *g* is closed, and the bottom of the lamp formed about as shown in Fig. 2, by the usual means of closing apertures and forming flanges on glass. The overblow at the bottom of the mold is also removed, leaving the glass protruding through the ring and a little beyond it. The previously-fitted metal top *a* is then applied to the screw-furnished ring *b*—that is, the top is screwed onto the ring, and may be removed at pleasure.

In connection with a lamp-top, applied as above described, we generally employ a compressible washer, *d*, between the glass neck *c* and the top *a*, to pack the joint and prevent the escape of oil between the glass and the lamp-top.

In blowing some kinds of glass lamps the mold may be dispensed with, the body of the lamp blown leaving a neck around the blow-hole, and the screw-furnished ring *b* applied on the outside of this neck, and the glass pressed out or worked out by hand, to fill the ring and form over or partially over its outer end, the same result being accomplished in the latter as in the former-described process—viz., the direct application of the screw-furnished ring to the glass by which the metal top is applied and rendered removable. We consider this a modification of our invention, or another way of doing the same thing, and embraced in the present invention.

The expanding and contracting properties of the metal ring and the glass should be as nearly equal as they can be made, and varying the metal to correspond with the contracting and expanding properties of the glass, or vice versa; and the ring should always be applied outside of the glass, as this provides for the application of the removable metal top, which may be ornamental as well as very useful and convenient, thereby adding to the novel properties of the invention and increasing its value.

We do not claim the application of the metal ring inside of a glass neck, tube, or cylinder, or inside of the top portion of a lamp, such an application of the ring having been previously made, and such an application of the metal ring we believe to be attended with greater difficulties and greater liabilities of breaking the glass; besides, as at present advised, we consider it difficult or quite impossible to blow the glass outside of the ring.

We claim as our invention—

The metallic ring *b*, when secured to the outside of the neck of a glass lamp, in the manner described, to facilitate the removal of the lamp-top, as set forth.

JONA. J. HOYT.
JOHN E. CRANE.

Witnesses:
A. R. BROWN,
E. A. ALGER.